United States Patent [19]
Stockman et al.

[11] Patent Number: 5,473,723
[45] Date of Patent: Dec. 5, 1995

[54] OPTICAL FIBRE SHEATHING TUBE

[75] Inventors: Anthony J. Stockman, The Black Granary Station Yard, Framlingham Suffolk IP13 9EE; Simon C. T. Benton, Felixstowe, both of United Kingdom

[73] Assignee: Anthony J. Stockman, United Kingdom

[21] Appl. No.: 232,076
[22] PCT Filed: Sep. 9, 1992
[86] PCT No.: PCT/GB92/02071
§ 371 Date: Apr. 26, 1994
§ 102(e) Date: Apr. 26, 1994
[87] PCT Pub. No.: WO93/09457
PCT Pub. Date: May 13, 1993

[30] Foreign Application Priority Data

Nov. 8, 1991 [GB] United Kingdom ............... 9123760

[51] Int. Cl.$^6$ ................................................ G02B 6/44
[52] U.S. Cl. ....................... 385/134; 385/69; 385/86; 385/100
[58] Field of Search ............................ 385/69, 86, 87, 385/100, 109, 114, 123, 125, 127, 134, 147, 136

[56] References Cited

U.S. PATENT DOCUMENTS

| | | | |
|---|---|---|---|
| 2,975,785 | 3/1961 | Sheldon | 385/109 X |
| 3,190,286 | 6/1965 | Stokes | 385/109 X |
| 4,801,764 | 1/1989 | Ohlhaber | 385/114 X |
| 4,826,277 | 5/1989 | Weber et al. | 385/100 |
| 5,179,617 | 1/1993 | Stockman | 385/136 |
| 5,202,942 | 4/1993 | Collins et al. | 385/87 |

FOREIGN PATENT DOCUMENTS

| | | |
|---|---|---|
| 55-042815 | 3/1980 | Japan. |
| 57-128305 | 8/1982 | Japan. |
| 58-048005 | 3/1983 | Japan. |
| 59-002003 | 1/1984 | Japan. |
| 59-031902 | 2/1984 | Japan. |
| 2080970 | 2/1982 | United Kingdom. |

*Primary Examiner*—John D. Lee
*Attorney, Agent, or Firm*—Dorn, McEachran, Jambor & Keating

[57] ABSTRACT

A sheathing for optical fibres and for optical fibre cables comprises a continuous length of tubing with the tubing walls being designed to allow the tube to be bent to a predetermined radius but to hinder its bending to a radius smaller than the predetermined radius. The tube walls (12) include portions (18) which are spaced apart when the tube is straight, but abut one another at (20) when the tube is bent to the predetermined radius.

14 Claims, 3 Drawing Sheets

OPTICAL FIBRE SHEATHING TUBE

TECHNICAL FIELD

The invention relates to optical fibre sheathing and particularly to protective sheathing for supporting and limiting the bend radius of optical fibre or optical fibre cable. The invention is applicable in situations where the fibre might have to follow a tight bend, for example adjacent to a connector board, in cable runs or in trunking.

The term "optical fibre" will be used in the rest of this specification to refer to both fibre alone and to optical fibre cable.

If an optical fibre is bent tightly, ie to a radius which is smaller than a critical radius, there is a significant increase in the transmission losses of the fibre. Below the critical radius the fibre no longer acts efficiently as a waveguide and so it is important to ensure that optical fibre as used in telecommunications and data communications is not bent below this critical radius. The problem is particularly apparent where it is necessary to have a large number of fibres connected through a single patch panel.

BACKGROUND ART

It is known to provide strain relief and/or bend limitation at the end of a fibre, where the fibre enters a fitting. Devices which provide such relief or bend limitation are known for example from EP 0,260,774, from DE 3,821,017 and from GB 2,142,788.

The present invention seeks to provide a structure which cannot be bent below a critical radius, or which can only be so bent by the application of extreme external force, and which provides mechanical protection to the fibre.

DISCLOSURE OF INVENTION

According to the invention, there is provided an optical fibre sheathing comprising a continuous length of tube, the tube being formed by extrusion and the outer surface of the tube wall being formed with circumferential grooves to permit bending of the tube until a predetermined radius of curvature has been reached, but to hinder bending of the tube beyond the predetermined radius of curvature.

The tube preferably has uniform properties over its whole length.

The tube may have a smooth internal bore. The internal bore is preferably dimensioned to accommodate a fibre as a loose fit within the bore.

The circumferential grooves in the surface have the effect of making any bending of the tube to a radius smaller than the predetermined radius very much more difficult than bending of the tube to the predetermined radius.

The circumferential grooves can be helical or annular. They may be formed by cutting, ie removing material from the outer tube surface, or (as is preferred) by local compression of the tube wall material around a helical or annular path.

In another embodiment, the tube wall can be shaped as a result of forming it from initially separate tube sections. The tube sections can comprise a first set having a first diameter and a second set having a second diameter, larger than the first diameter. The sections can then be joined to form a continuous tube length by positioning the first sections spaced apart and then bridging the gaps between the first sections by second sections which are joined to adjacent first sections.

Preferably, both sets of tube sections are formed from extruded tube lengths, with the first set having a relatively rigid inner wall and a relatively flexible outer wall and the second set having a relatively rigid outer wall and a relatively flexible inner wall. The inner and outer walls may be formed by a co-extrusion process, and the outer walls of the first set of sections can be joined to the inner walls of the second set of sections by adhesive or by a plastics welding process.

The tube may be internally sheathed with a smooth walled plastics material to provide a smooth inner wall and thereby to facilitate movement of the fibre within the tube.

The sheathing of the invention can be formed around an optical fibre during the production of the fibre's protective coatings, and may be an integral part of the fibre outer covering.

BRIEF DESCRIPTION OF DRAWINGS

The invention will now be described by way of example with reference to the accompanying drawings in which.

MODES FOR CARRYING OUT THE INVENTION

Figure 1:
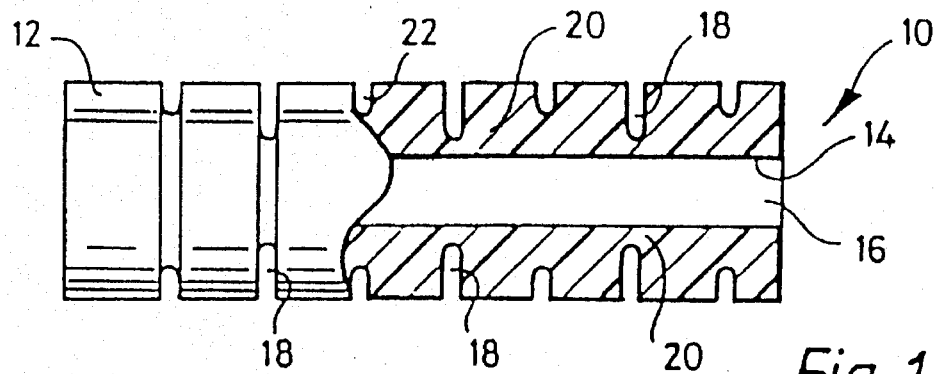
FIG. 1 shows a section of a first embodiment of an optical fibre sheathing, partly in cross section.

The sheathing 10 shown in FIG. 1 is extruded, as a plain-walled tube, from a plastics material such as polypropylene. The tube has an outer wall 12 and an inner wall 14 which defines an internal bore 16.

A plain-walled tube can be bent to virtually any radius and the amount of applied force necessary to do this bending, especially as the radius or curvature becomes smaller, increases progressively and steplessly. In order to prevent overbending of an optical fibre located in the bore 16, the invention modifies a plain-walled tube so that the tube can be bent up to a predetermined radius by application of a relatively low force, but can only be bent beyond this radius, if at all, by application of a significantly higher force. To achieve this, the outer wall 12 of the tube is formed, subsequent to extrusion, with annular grooves 18. In the first embodiment, shown in FIG. 1, the grooves are formed by cutting away material from the tube wall. In a sheathing 110 which forms a second embodiment and is shown in FIG. 2, grooves 118 of the same dimension are formed, but by locally compressing the wall material.

Figure 3:
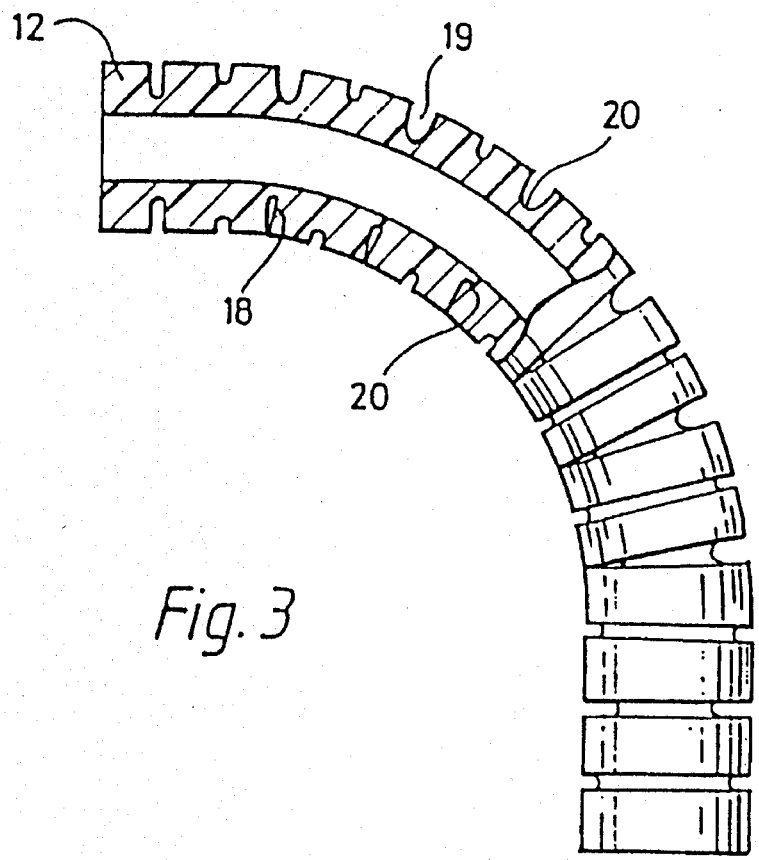
FIG. 3 shows how the sheathings of the first and second embodiments behave on bending.

The function of the grooves 18 is best illustrated in FIG. 3 from which it can be seen that on the inner side of the curve, the grooves 18a close up and the peripheral edges of the grooves come into contact to limit further bending. Up to this point, bending takes place by flexing the "hinges" 20 formed by the material remaining at the bases of the grooves 18. Beyond this point, application of extreme force can result in further bending but when this happens, there will be distortion of the plastics material.

Figure 2:
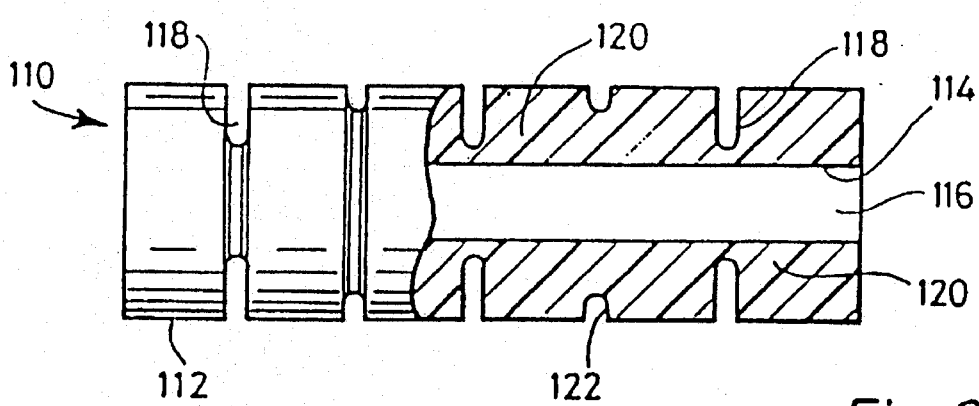
FIG. 2 shows a section of a second embodiment of an optical fibre sheathing, partly in cross section.

Although the configuration of the tubes shown in FIGS. 1 and 2 appears similar, the configuration shown in FIG. 2 where the plastics material is compressed will in fact result in stronger "hinges" 120 because the material will have been subjected to stress in a longitudinal direction resulting in tensile strain and will be more dense locally. This results in some advantageous alignment of polymer chains.

Other methods of causing alignment of the polymer chains in the region of the inner wall can be used. For example it is possible to pass an oversized mandrel through the tube bore which has the result of expanding the diameter of the bore and aligning the polymer chains.

The tubes 10 and 110 both also have secondary grooves 22, 122 which are smaller than the grooves 18, 118. These secondary grooves allow some bending to take place if the tube is overstressed. The grooves 22, 122 are also intended to facilitate the gripping of the external surface of the tube, for example by tangs or barbs on an optical fibre terminal fitting.

Figure 4:
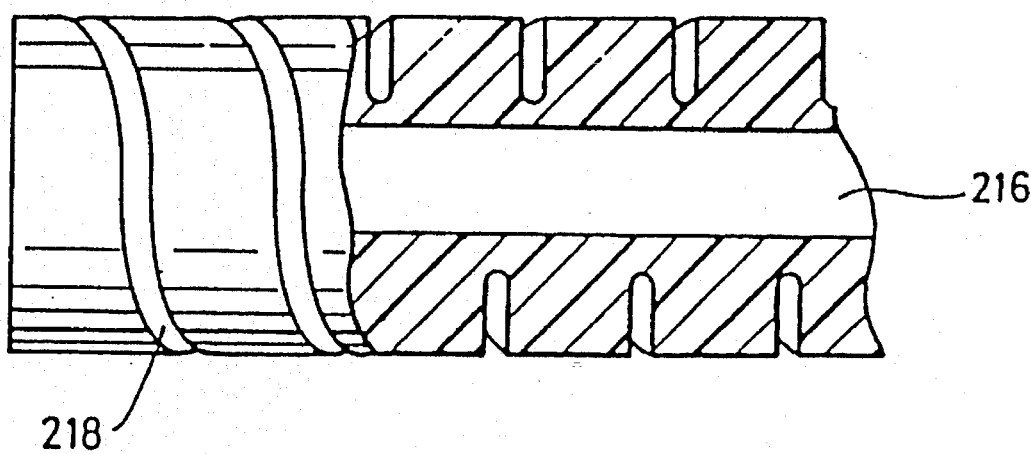
FIG. 4 shows a section of a third embodiment of an optical fibre sheathing, partly in cross section.
Figure 5:
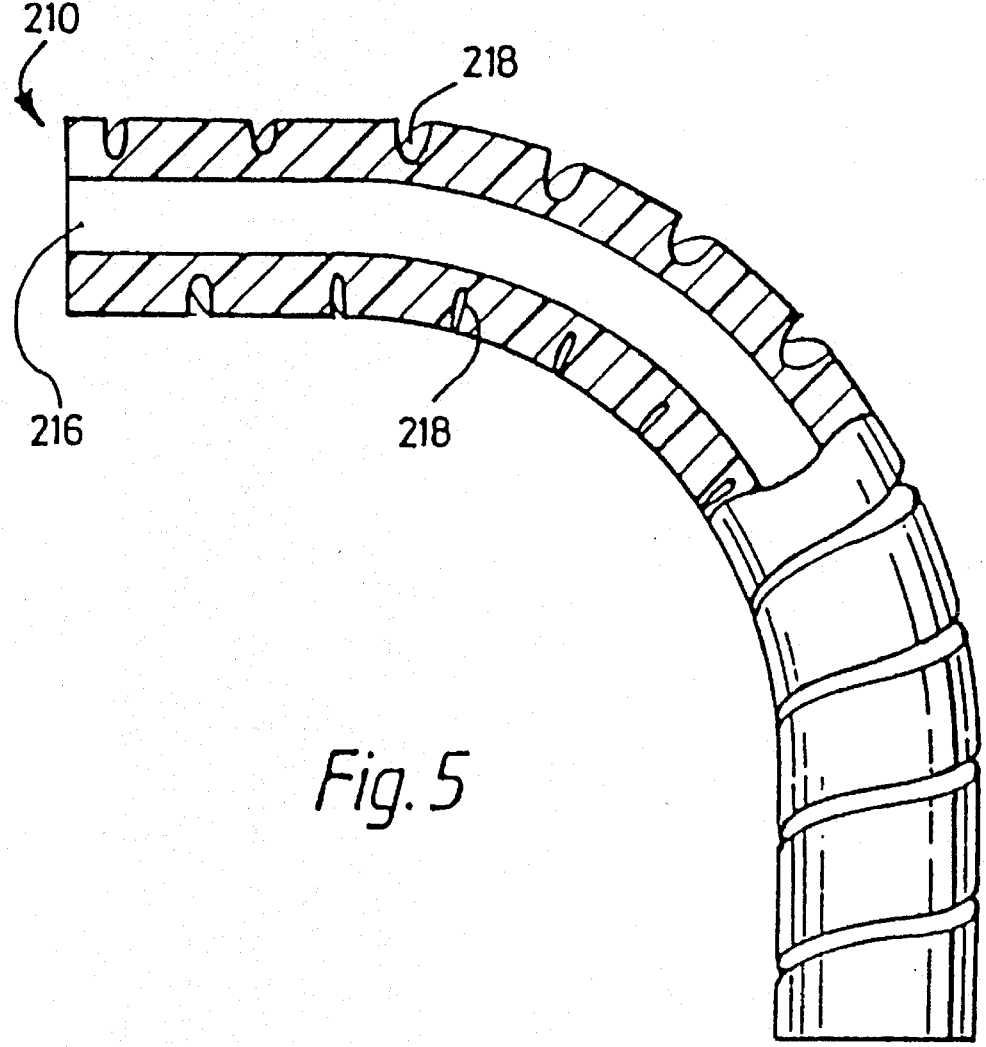
FIG. 5 shows how the sheathing of the third embodiment behaves on bending.

FIGS. 4 and 5 show a third embodiment in which a tube 210 differs from the first and second embodiments only in that the groove 218 is a continuous helical groove rather than a plurality of discrete circumferential grooves. The groove 218 can also be formed either by cutting the tube wall material or by locally compressing it.

In all of the first, second and third embodiments, the internal bore 16, 116, 216 is intended to fit loosely around an optical fibre received in the bore so that the tube can be moved freely along the length of the fibre.

Figure 6:
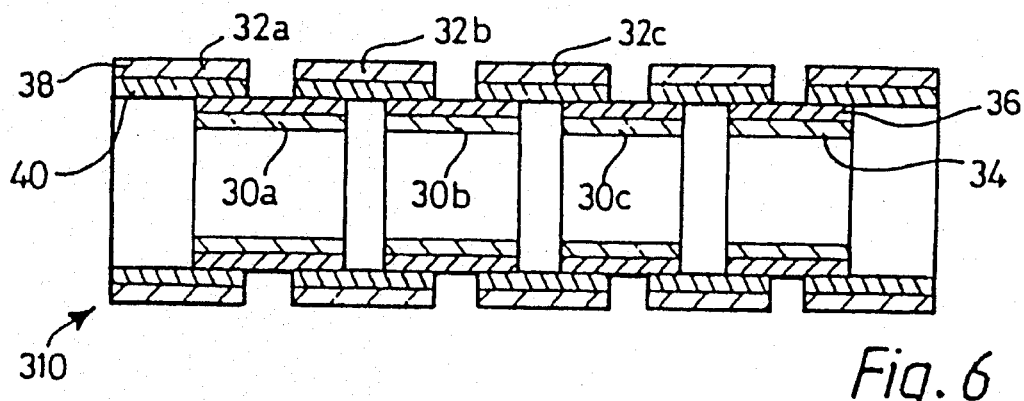
FIG. 6 shows a section of a fourth embodiment of an optical fibre sheathing according to the invention.
Figure 7:
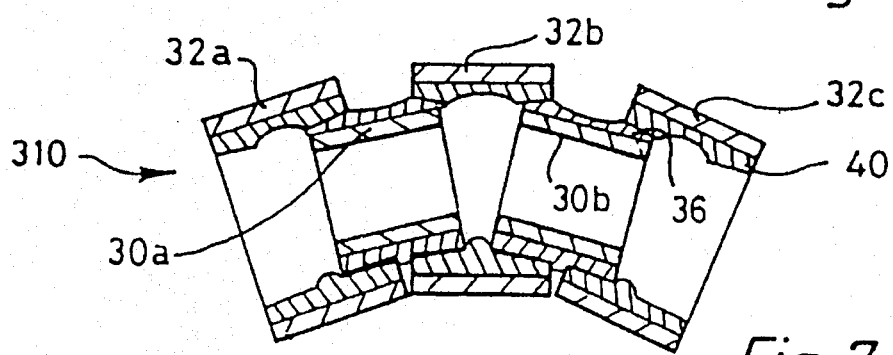
FIG. 7 shows, on a large scale, how the sheathing of the fourth embodiment behaves on bending.
Figure 8:
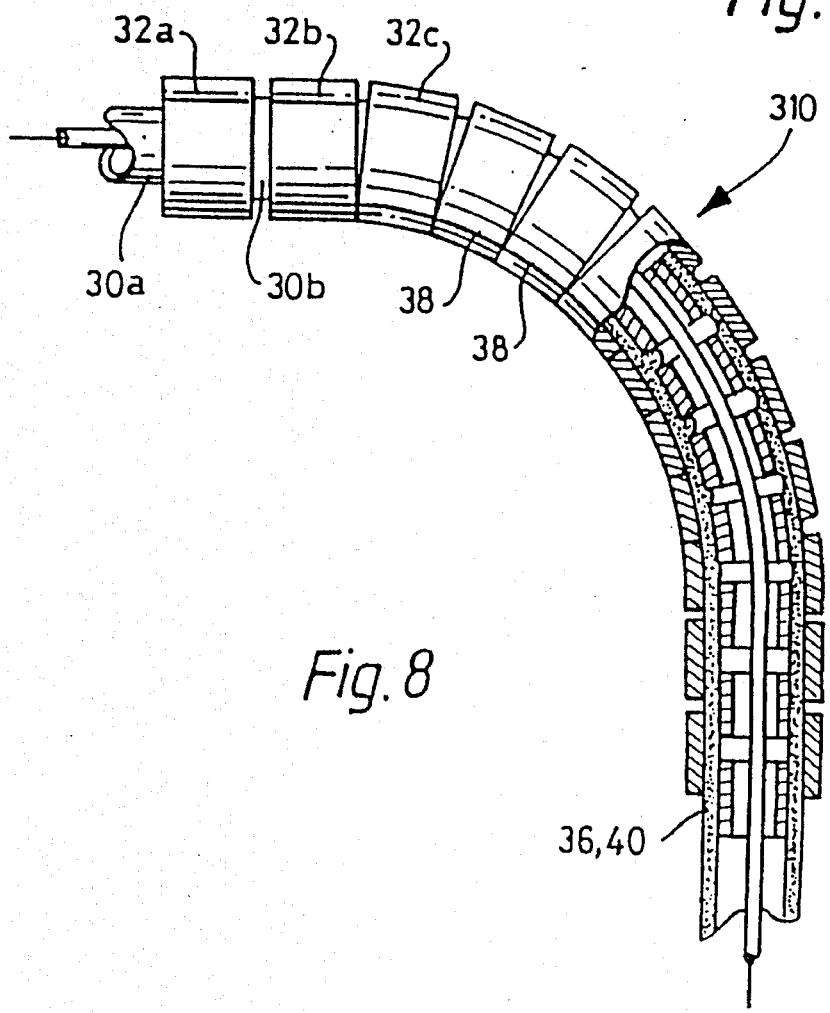
FIG. 8 shows, on a smaller scale, how the sheathing of the fourth embodiment behaves on bending.

FIGS. 6, 7 and 8 show an embodiment of the invention where a sheathing 310 is constructed from individual tube sections 30a, 30b, 30c, . . . . and individual tube sections 32a, 32b, 32c, . . . . . . . The tube sections 30 are all prepared by subdividing a length of tubing, and the sections 32 are similarly prepared. The tube from which the sections 30 are made has an inner wall 34 of a rigid plastics material and an outer wall 36 of a flexible plastics material with elastomeric properties. The tube from which the sections 32 are made has an outer wall 38 of rigid plastics material and an inner wall 40 of flexible plastics material. The sheathing is assembled with the inner and outer tube sections offset as shown and with the flexible inner and outer walls welded or glued together.

When this sheathing is bent, the flexible walls yield as shown and the outer rigid walls 38 abut each other on the inside of the bend when the predetermined radius of curvature is reached. The sheathing can only be bent to a smaller radius by stretching the flexible walls 36, 40.

FIG. 8 illustrates the situation when this sheathing is bent to the predetermined radius. FIG. 8 in fact shows the flexible plastics walls 36, 40 as forming a single, homogenous tubular membrane, because both walls are likely to be of the same material, and once they are welded together they do form a continuous wall.

FIG. 8 also shows an optical fibre 42 extending through the sheathing 310. The intended relative dimensions of the fibre 2 and of the internal bore 316 can be seen here.

The flexible plastics material used for the walls 36, 40 can be an elastomer chosen to give the desired degree of flexibility to the sheathing. By suitable choice of the elastomer, it is possible to tailor the sheathing to characteristics required for a particular installation. In addition, the use of an elastomer as an element in the wall construction can assist in protecting the fibre against external physical shocks.

In an alternative manufacturing method, the two sets of tube sections 30, 32 can be formed independently and can be joined by an annular elastomeric sleeve onto or into which they are all threaded, or can be joined by extruding an elastomer between the two sets of tube sections.

Another possibility is to make a triple extrusion with the flexible, elastomeric wall component sandwiched between a relatively rigid outer wall and an inner wall which is more rigid than the elastomer. The outer wall can then be cut away to provide the bend limiting function. The inner wall can be thin and can include tensile components. This construction has the advantage of providing a smooth internal bore and lends itself to continuous manufacturing processes.

INDUSTRIAL APPLICABILITY

The sheathing described here can be used to protect optical fibre from excessive bending in any optical fibre installation. The sheathing can be fitted over a fibre before terminal fittings are attached to the fibre ends, or can be fitted around the fibre without requiring access to the fibre ends. Because the sheathing exists in continuous lengths, any required length can be cut and fitted around any particular part of a fibre where protection against excessive bending is required. The sheathings described here can give protection against external mechanical damage, such as abrasion or crushing, to the fibre, and can also be used to provide a barrier between the fibre and a local environment. For example, if resistance to a particular chemical environment is required, then the sheathing can advantageously provide the necessary protection. This principle can be extended to protect the environment, or people nearby, from the adverse effects of the presence of the fibre. One particular example of this protection is where fire retardancy is required.

We claim:

1. An optical fibre sheathing comprising a continuous length of tube, the tube being formed by extrusion and having a tube wall bounding a tube bore for carrying a length of fibre, wherein the outer surface of the tube wall has circumferential grooves formed in the wall thickness and around the whole outer surface of the tube to permit bending of the tube in any plane until a predetermined radius of curvature has been reached, but to hinder bending of the tube beyond the predetermined radius of curvature to an equal extent in any plane.

2. An optical fibre sheathing as claimed in claim 1, wherein the tube has uniform properties over its whole length.

3. An optical fibre sheathing as claimed in claim 1 or claim 2, wherein the tube has a smooth internal bore.

4. An optical fibre sheathing as claimed in claim 1, wherein the circumferential grooves are helical.

5. An optical fibre sheathing as claimed in claim 1, wherein the circumferential grooves are annular.

6. An optical fibre sheathing as claimed in claim 1, wherein the circumferential grooves are formed by cutting the outer tube surface.

7. An optical fibre sheathing as claimed in claim 1, wherein the circumferential grooves are formed by local compression of the tube wall material around a helical path or annular paths.

8. An optical fibre sheathing as claimed in claim 1, wherein the tube is formed from a plurality of initially separate extruded tube sections.

9. An optical fibre sheathing as claimed in claim 8, wherein the tube sections comprise a first set having a first diameter and a second set having a second diameter, larger than the first diameter.

10. An optical fibre sheathing as claimed in claim 8 or claim 9, wherein the sections are joined to form a continuous tube length by positioning the first sections spaced apart and then bridging the gaps between the first sections by second sections which are joined to adjacent first sections.

11. An optical fibre sheathing as claimed in claim 10, wherein the first set of sections has a relatively rigid inner wall and a relatively flexible outer wall and the second set has a relatively rigid outer wall and a relatively flexible inner wall.

12. An optical fibre sheathing as claimed in claim 11, wherein the inner and outer walls are formed by a co-extrusion process.

13. An optical fibre sheathing as claimed in claim 11 or claim 12, wherein the outer walls of the first set of sections are joined to the inner walls of the second set of sections by a plastics welding process.

14. An optical fibre sheathing as claimed in claim 8, wherein the tube is internally sheathed with a smooth walled plastics material to provide a smooth inner wall.

* * * * *